(12) United States Patent
Wyatt et al.

(10) Patent No.: US 11,016,990 B2
(45) Date of Patent: May 25, 2021

(54) FENCING OUT NODES IN A DISTRIBUTED CLUSTERED SYSTEM

(71) Applicant: salesforce.com, inc., San Francisco, CA (US)

(72) Inventors: Nathaniel Wyatt, San Francisco, CA (US); Steven Raspudic, Walnut Creek, CA (US); Venkateswararao Jujjuri, Beaverton, OR (US)

(73) Assignee: salesforce.com, inc., San Francisco, CA (US)

( * ) Notice: Subject to any disclaimer, the term of this patent is extended or adjusted under 35 U.S.C. 154(b) by 827 days.

(21) Appl. No.: 15/667,285

(22) Filed: Aug. 2, 2017

(65) Prior Publication Data

US 2019/0045007 A1    Feb. 7, 2019

(51) Int. Cl.

| G06F 16/00 | (2019.01) |
|---|---|
| G06F 16/27 | (2019.01) |
| G06F 16/20 | (2019.01) |
| G06F 11/00 | (2006.01) |
| G06F 16/35 | (2019.01) |
| H04L 29/08 | (2006.01) |
| G06F 11/07 | (2006.01) |

(52) U.S. Cl.
CPC ........... *G06F 16/27* (2019.01); *G06F 11/008* (2013.01); *G06F 16/20* (2019.01); *G06F 16/35* (2019.01); *H04L 67/1097* (2013.01); *G06F 11/0751* (2013.01); *G06F 2209/505* (2013.01)

(58) Field of Classification Search
CPC .... G06F 17/27; G06F 16/174; G06F 16/1748; G06F 16/27; H04L 61/1511; H04L 67/1097

USPC .................................................... 707/999.02
See application file for complete search history.

(56) References Cited

U.S. PATENT DOCUMENTS

| 5,649,089 | A  | 7/1997 | Kilner |
| 6,205,510 | B1 | 3/2001 | Mendel |
| 7,734,580 | B2 | 6/2010 | Lahiri et al. |
| 7,739,677 | B1 | 6/2010 | Kekre et al. |
| 7,913,050 | B2 | 3/2011 | Bagal et al. |
| 8,145,938 | B2 | 3/2012 | Gupta |
| 8,381,017 | B2 | 2/2013 | Bae et al. |

(Continued)

FOREIGN PATENT DOCUMENTS

EP    0772126 A2    5/1997

OTHER PUBLICATIONS

International Search Report and Written Opinion in PCT Appl. No. PCT/US2018/044976 dated Oct. 11, 2018, 16 pages.

*Primary Examiner* — Vincent F Boccio
(74) *Attorney, Agent, or Firm* — Kowert, Hood, Munyon, Rankin & Goetzel, P.C.

(57) ABSTRACT

Techniques are disclosed relating to fencing out a first one of a plurality of nodes configured to handle requests for data stored in a distributed storage. A database system, in various embodiments, stores a value indicating that the first node is permitted to update a catalog stored at a metadata server. In response to a determination to prevent the first node from updating the catalog and writing to the distributed storage, in various embodiments, the database system updates the value to indicate that the first node is not permitted to update the catalog and instructs the distributed storage to prevent write operations to a particular portion allocated to the first node for writing data.

18 Claims, 7 Drawing Sheets

(56) References Cited

U.S. PATENT DOCUMENTS

| | | |
|---|---|---|
| 8,707,082 B1 | 4/2014 | Chen et al. |
| 8,868,504 B2 | 10/2014 | Aranha et al. |
| 9,146,790 B1 | 9/2015 | Dash et al. |
| 9,342,575 B2 | 5/2016 | Alewine et al. |
| 2009/0204649 A1* | 8/2009 | Wong .................. G06F 16/1744 |
| 2010/0115620 A1* | 5/2010 | Alme .................. H04L 63/1416 |
| | | 726/24 |

* cited by examiner

FENCING OUT NODES IN A DISTRIBUTED CLUSTERED SYSTEM

BACKGROUND

Technical Field

This disclosure relates generally to high availability systems and, more specifically, to clustered database systems.

Description of the Related Art

When an organization wishes to store information for their users, the organization typically implements a database system that stores this information in an organized manner that may be efficiently accessed. Database systems for large enterprise systems may rely on multiple servers to implement a computer cluster, where individual servers act as cluster nodes running an instance of a database application. These nodes may individually service requests from users to operate on data. In order to ensure cluster reliability, a cluster may need to account for the scenario in which a node malfunctions.

Figure 1:
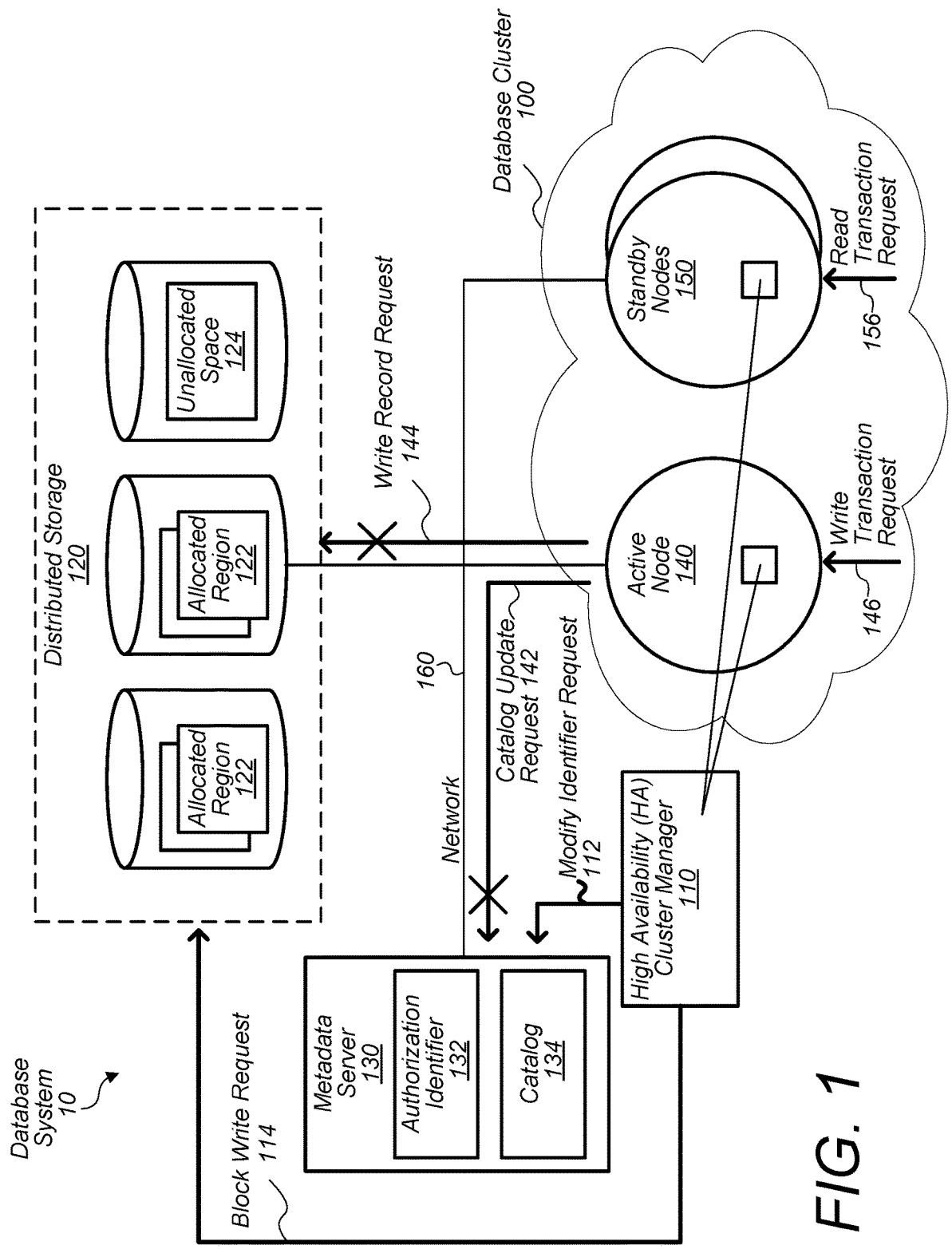
FIG. 1 is a block diagram illustrating exemplary elements of a database system that implements a database, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to execute an instance of a database management application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a database system having eight nodes, the terms "first" and "second" nodes can be used to refer to any two of the eight nodes.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Since malfunctioning database nodes have the potential to corrupt data and/or interfere with database operation, it may be important to fence off (i.e., isolate) a problematic database node. One approach to isolating a malfunctioning node involves physically powering it down—referred to as the Shoot The Other Node In The Head (STONITH) approach. In this approach, the malfunctioning node is typically shutdown by flipping the power switch on the node either by hand or using a robotic control process. Such an approach, however, does not stop input/output that is currently being communicated on the "wire" or at the controller level. Another approach involves issuing a series of complex Small Computer System Interface (SCSI) commands to leverage functionality of the SCSI protocol—often referred to as SCSI Fencing. This approach, however, does not work well in distributed database systems as the complexity increases when data is shared across multiple discs and controllers.

The present disclosure describes techniques for fencing out database nodes in a way that overcomes the downsides of the prior approaches. In various embodiments described below, a database system fences out a database node by preventing it from 1) updating a catalog to indicate new database portions that have been allocated for writing data at a shared storage and from 2) writing to already allocated portions. To prevent the catalog from being updated, a metadata server of the database system may maintain an identifier that indicates whether a database node may update the catalog. As such, when a database node wishes to update the catalog, it may communicate with the metadata server to determine whether it has the authority to do so—this authority being based on the maintained identifier. In such an embodiment, if the database node is to be fenced off, the database system may update the identifier at the metadata server to indicate that the database node does not have the authority to update the catalog. To prevent the malfunctioning node from writing to the already allocated portions, the database system may instruct the shared storage storing the allocated portions to prevent any new writes to already allocated portions. This fencing approach may be advantageous over prior approaches as, for example, it does not rely on some external mechanism (e.g., an administrator) to power down the node and is less complex than a solution, for example, based on SCSI.

Turning now to FIG. 1, a block diagram of a database system 10 is depicted. In the illustrated embodiment, database system 10 includes a database cluster 100, a distributed storage 120, and a metadata server 130 coupled via a network 160. As shown, cluster 100 includes an active node 140 and standby nodes 150, each running a high availability (HA) cluster manager 110. Further as shown, distributed storage 120 includes allocated regions 122 and unallocated space 124, and metadata server 130 includes an authorization identifier 132 and a catalog 134. Although not shown, various client devices (e.g., application servers) may interact with nodes 140 and 150 by sending requests to perform database transactions. In some embodiments, database system 10 may be implemented differently than shown. For example, in some embodiments, database system 10 includes multiple active nodes 140. Storage 120 may also not be a distributed storage.

Database system 10, in various embodiments, is implemented in part via nodes 140 and 150, which are configured to operate as a database cluster 100 and process transaction requests 146 and 156. These requests may include reading and/or writing data to storage 120. For example, active node 140 may receive a request 146 to update a user's password to a new value and thus may write a record to an allocated region 122 where the record includes the value. In some embodiments, database system 10 implements an HA service using an active-standby topology in which one or more of the database nodes are elected for writing data to storage 120 on behalf of the other nodes—the elected node being shown as active node 140 and the non-elected nodes being shown as standby nodes 150.

Active node 140, in various embodiments, is configured to service requests to read and write data to distributed storage 120 (despite only write transaction request 146 being shown). Accordingly, active node 140 may receive a write transaction request 146 from a client device and issue a corresponding write record request 144 to write data to an allocated region 122 in storage 120. In some embodiments discussed below, allocated regions 122 are files created by node 140 from unallocated space 124 in storage 120 where records may be written and read. Active node 140 is discussed in greater detail below with respect to FIG. 3.

Standby nodes 150, in various embodiments, are configured to service read requests 156 to provide data stored in distributed storage 120 (and/or serve as backup nodes that are configured to take over the role of an active node 140 if warranted). In various embodiments, standby nodes 150 may each maintain metadata about the current state of database system 10. For example, a node 150 may maintain a local cache storing metadata that is also being stored by storage 120. In such an embodiment, standby nodes 150 may receive, from client devices, read transaction requests 156 for data stored in storage 120. In response to these requests, standby nodes 150 may retrieve the requested data from their local caches (as opposed to storage 120) if the data is already present in the cache. In order to ensure that their local caches are concurrent with the data in storage 120, in some embodiments, nodes 150 may consult catalog 134 to identify what new regions 122 have been allocated at storage 120 and subsequently, what records have been written. The records may be read from storage 120 to determine any modifications to data in storage 120 that might affect data in their local caches. If data in a local cache is affected (e.g., the value of a key-value pair has been updated or deleted), a standby node 150 may update the cache to reflect the modification of the data in storage 120 (e.g., by updating or invalidating a cache entry). This may allow standby nodes to maintain caches that are reflective of the current state of database system 10. As noted above, one of the standby nodes 150 may be elected to become active node 140—at which point, the node may service write transaction requests 146. Maintaining up-to-date metadata about the current state of system 10 may allow a newly elected node 150 to more quickly take on the role of an active node 140.

HA cluster manager 110, in various embodiments, is an application executable to manage cluster resources in order to achieve high availability for cluster 100 (or more generally database system 10). Accordingly, in some embodiments, manager 110 is executable to detect failures of nodes 140 and 150 and facilitate failovers. In particular, manager 110 may be distributed across nodes 140 and 150 such that it may monitor the health by monitoring for a heartbeat signal sent by each node 140 and 150 to indicate that the nodes 140 and 150 have not become unresponsive. If, for example, the current active node 140 is not responding with the heartbeat signal, manager 110 may facilitate a failover by holding an election to select a new active node 140 from standby nodes 150 and promoting the elected standby node 150 to become active node 140. In some embodiments, manager 110 may alternatively sent a request to each node 140 and 150 and wait for a corresponding response to ensure nodes 140 and 150 are still responsive. In some embodiments, manager 110 may also hold an election in response to a request from a user such as an administrator. (In some embodiments, elections may alternatively be conducted by metadata server 130 discussed below.)

As will be described in greater detail below, manager 110 may also be executable to fence out nodes 140 and 150 in response to a determination that a node is malfunctioning (or in response to a user request). (Although various fencing operations will be described below as being performed by manager 110, in some embodiments, these operations may be performed by an entity other than manager 110.) In various embodiments discussed below, manager 110 may fence out node 140 by preventing it from updating catalog 134 and from writing to allocated regions 122. This process is described in more detail below after briefly discussing storage 120 and metadata server 130.

Distributed storage 120, in various embodiments, is a shared storage configured to store data for users of system 10. In some embodiments, storage 120 may be implemented by multiple storage devices connected together on a network (e.g. a storage attached network (SAN)) and configured to redundantly store data in order to prevent data loss. In various embodiments, storage 120 is configured to implement a log-structured storage (e.g., a write-ahead log (WAL)) in which an active node 140 allocates a new region/portion 122 for storing new transaction data (as opposed to overwriting existing transaction data). For example, a particular region 122 may include an account balance of a user. In such an example, if a transaction request 146 is received to update the account balance, active node 140 may not modify the previously stored account balance in the particular region 122; rather, the active node 140 may submit a request 144 to write a new record identifying the new account balance in a newly allocated region 122 (or in the particular region 122). In some embodiments, an active node 140 may allocate a region 122 of unallocated space 124 by creating a file (or requesting that storage 120 create the file) for storing new transaction data. As transaction requests 146 are received, active node 140 may write new records to the file. When the file becomes full, an active node 140 may close the file/region 122 and allocate a new region 122 by creating another file for storing records. In some embodiments, an active node 140 may allocate multiple regions 122 at a given time to store transaction data—e.g., a block of ten regions 122. As will be discussed in greater detail, in various embodiments, active node 140 updates catalog 134 (via a request 142 shown in FIG. 1) when it allocates new regions 122 and closes out old ones, which are full of records. These updates may be reviewed by standby nodes 150 in order to become aware of newly allocated regions 122 and to read the contents of those regions 122. For example, nodes 150 may read the database records in a given region 122 so that they can update various locally maintained metadata (such as their local caches noted above) to reflect the current state of the database system. As will be described below, access to catalog 134 may be restricted when attempting to fence out an active node 140.

In various embodiments, storage 120 is configured to maintain metadata indicating whether allocated regions 122 are permitted to be written to by an active node 140. For example, in some embodiments, this metadata may include a write flag for each region 122 indicating whether the current active node 140 is allowed to write records to the associated allocated region 122 (or more generally whether any node in system 10 can modify a region 122). As will be discussed below, these write flags may be set by manager 110 in response to a determination that a node 140 is to be fenced out.

Metadata server 130, in various embodiments, is configured to maintain metadata usable by nodes 140 and 150 to implement database system 10. For example, as shown, server 130 may maintain a catalog 134 that may specify a schema defining various database structures and objects, indexes for looking up data in the database, user permissions for accessing database information, etc. As mentioned above, in some embodiments, catalog 134 stores metadata providing indications of allocated regions 122. This metadata may include location information (such as region 122 IDs, keys, etc.) that identifies physical locations in storage 120 where corresponding allocated regions 122 are located. In response to catalog 134 being modified, server 130 may notify nodes 150 that catalog 134 has changed. Accordingly, nodes 150 may then review catalog 134 and use the newly-added keys to locate the corresponding allocated regions 122; in various cases, nodes 150 may periodically review catalog 134 without being notified.

As noted above, active node 140 may be responsible for updating catalog 134 via a catalog update request 142 after allocating a region 122. Server 130, in various embodiments, maintains a value (shown as an authorization identifier 132) indicating whether the current active node 140 may update catalog 134. When active node 140 wants to update catalog 134, in various embodiments, it determines whether identifier 132 has been modified. If identifier 132 has not been modified, node 140 may proceed to update catalog 134. If, however, identifier 132 has been modified, node 140 may not update catalog 134 to reflect newly allocated regions 122.

As noted above, in various embodiments, HA cluster manager 110 may determine at some point that fencing out active node 140 is warranted because, for example, a heartbeat signal is no longer being received, a user has requested it, etc. In response to making such a determination, manager 110 may seek to prevent the active node 140 from writing possibly corrupt records and from allocating additional regions 122 for writing more possibly corrupt records. In order to prevent node 140 from updating catalog 134, in various embodiments, manager 110 issues a request (shown as a modify identifier request 112) for metadata server 130 to modify authorization identifier 132. In some embodiments, this request 112 may come from a newly elected standby node 150 executing an instance of manager 110. As discussed above, in such an embodiment, once identifier 132 has been modified, active node 140 is not permitted to update catalog 134. Catalog update request 142 is thus depicted with an "X" in FIG. 1 to indicate that active node 140 has been prevented from updating catalog 134. In some embodiments, active node 140 is configured to discontinue allocating new regions 122 if it is unable to update catalog 134 to reflect already allocated regions 122—thus, node 140 is effectively barred from allocating new regions 122 to store new records in response to authorization identifier 132 being modified.

In order to prevent node 140 from writing to regions 122 that have already been allocated, in the illustrated embodiment, manager 110 issues a block write request 114 to storage 120. This request may instruct storage 120 to prevent write operations to a specified set of allocated regions 122 and, in some embodiments, be issued by the newly elected node 150. In response to receiving request 114, storage 120 may set the write flags associated with the specified set of regions 122 to prevent active node 140 from writing records to them. Afterwards, when node 140 issues a write record request 144 to storage 120, in some embodiments, storage 120 determine, from the flags, to reject the request 144 and not add another record to already allocated region 122. Write record request 144 is thus depicted with an "X" in FIG. 1 to indicate that node 140 has been prevented from writing records to specific regions 122.) In blocking catalog update request 142 and write record requests 144, manager 110 effectively fences out active node 140, preventing it from potentially corrupting data in database system 10.

Figure 2:
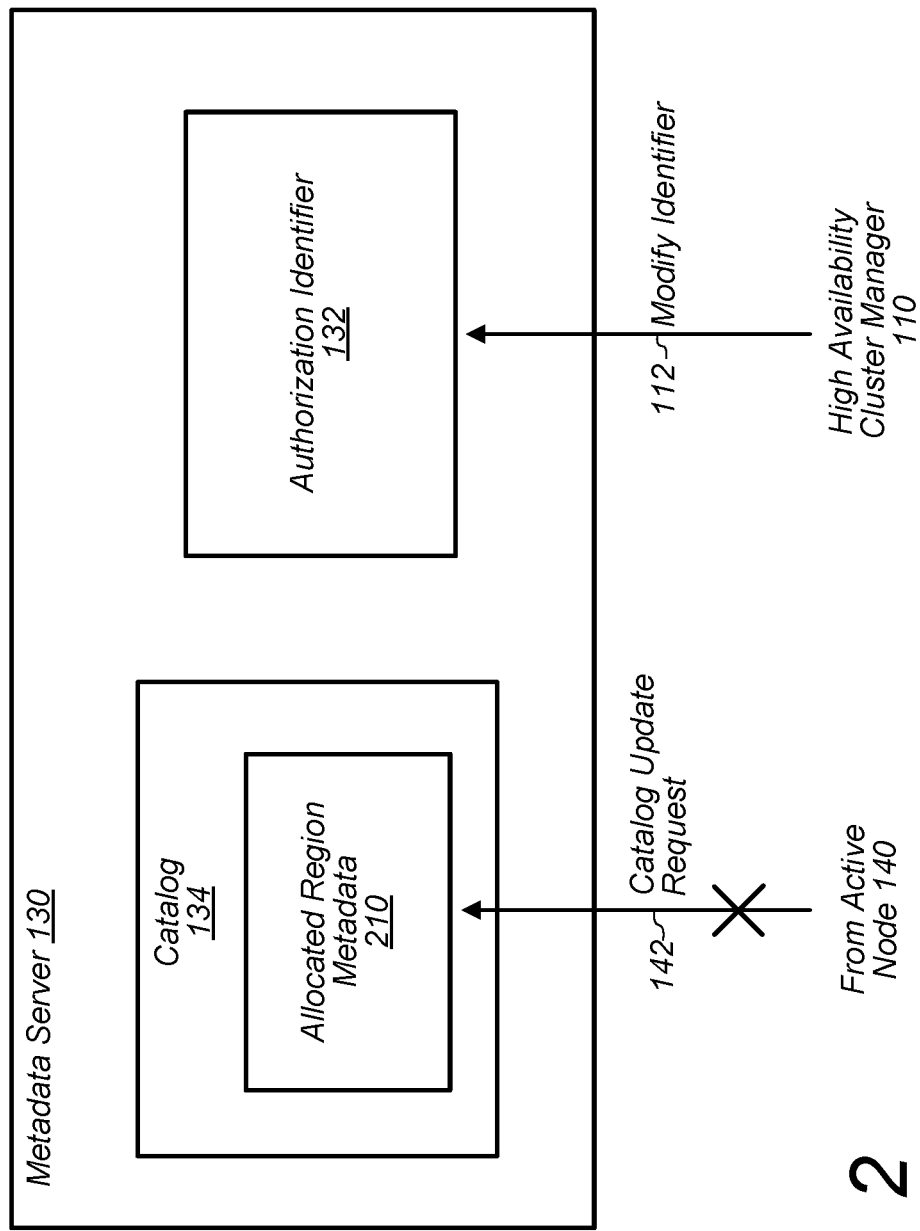
FIG. 2 is a block diagram illustrating exemplary elements of a metadata server that maintains an authorization identifier, according to some embodiments.

Turning now to FIG. 2, a block diagram of one embodiment of metadata server 130 is shown. As mentioned above, in various embodiments, server 130 is configured to store metadata usable by nodes 140 and 150 to implement database system 10. In the illustrated embodiment, server 130 includes an authorization identifier 132 and a catalog 134. Further as shown, catalog 134 includes allocated region metadata 210. In various embodiments, metadata server 130 may be implemented differently than shown.

As noted above, catalog 134, in various embodiments, includes metadata 210 usable by nodes 140 and 150 to locate regions 122 in storage 120. In some embodiments, metadata 210 may include keys that map to physical locations in storage 120 where corresponding allocated regions 122 are stored. In response to allocating a region 122 at storage 120 (e.g., opening a file for storing records), node 140 may attempt to update catalog 134 to include keys for the allocated regions 122. Catalog 134 may then be updated again once a node 140 has filled a region 122 with records (e.g., and is closing the file). Accordingly, nodes 150 that wish to read written records may first consult catalog 134 by requesting keys from server 130. Nodes 150 may then issue the keys to storage 120, which may implement a key-value store that returns the written records in response to receiving the keys. In some embodiments, metadata 210 further includes additional metadata, which may be used by a standby node 150 in becoming the active node 140 such as an append point specifying a particular region 122 where the next record may be written, a tail marker specifying the oldest region 122, time stamps for each region 122, etc.

As noted above, in various embodiments, authorization identifier 132, is a value that indicates whether the current active node 140 may update catalog 134. In some embodiments, identifier 132 explicitly identifies the active node 140. For example, identifier 132 may be an IP address of the node 140, a unique node identifier, etc. In other embodiments, as will be discussed with FIG. 3, identifier 132 does not explicitly identify a node 140; rather, identifier 132 is a sequence of alpha and/or numeric characters that is set upon a node becoming the current active node 140 and remains unaltered as long as the node is still the active node 140. Accordingly, in such an embodiment, identifier 132 is updated only when manager 110 elects a new active node 140.

Figure 3:
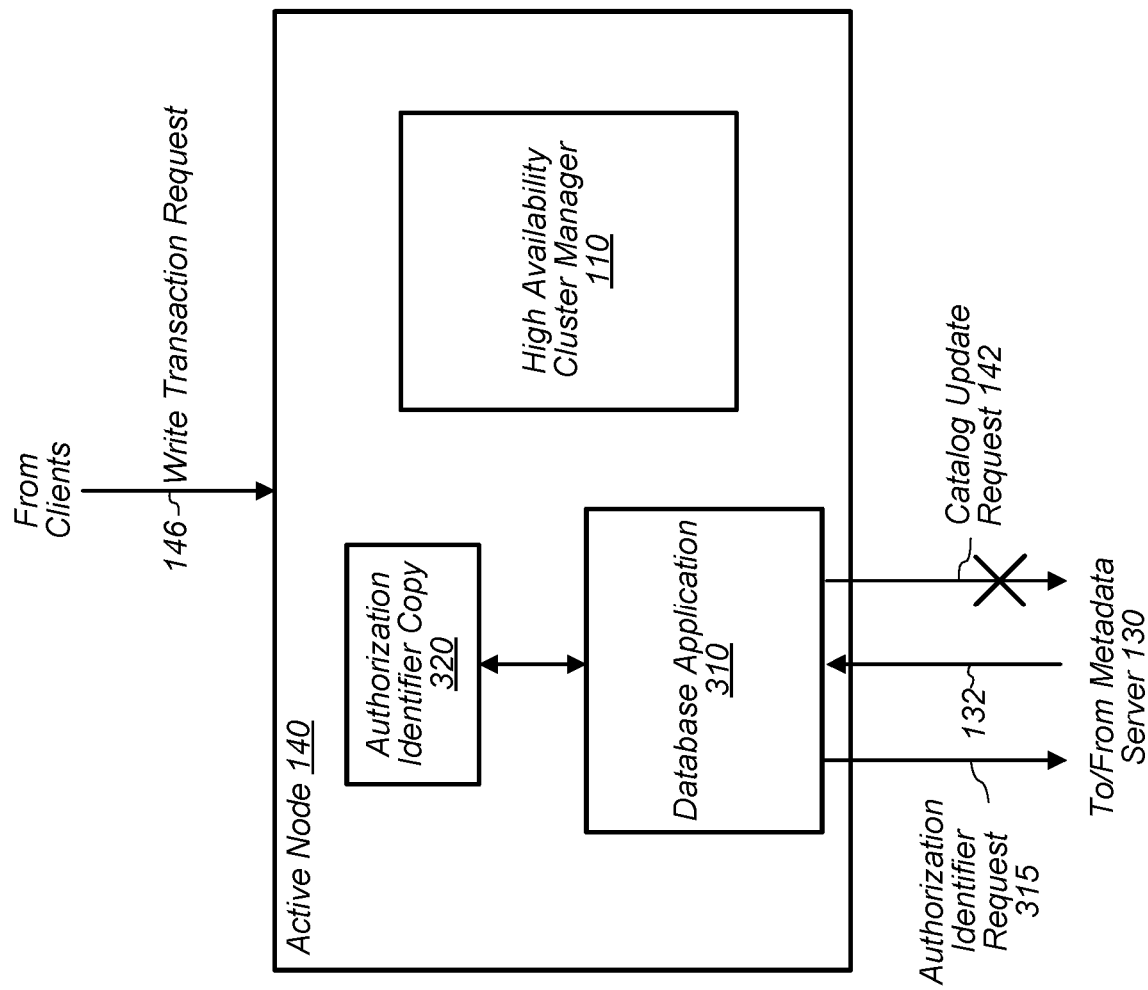
FIG. 3 is a block diagram illustrating exemplary elements of an active node that services requests for writing data to a distributed storage, according to some embodiments.

Turning now to FIG. 3, a block diagram of one embodiment of an active node 140 is shown. In the illustrated embodiment, active node 140 includes an instance of HA cluster manager 110, a database application 310, and an authorization identifier copy 320. In various embodiments, active node 140 may be implemented differently than shown. For example, HA cluster manager 110 and database application 310 a part of the same application.

Database application 310, in various embodiments, is an application executable by node 140 to service requests 146 and 156 from clients including the writing and reading of records from regions 122. In some embodiments, application 310 is also executable to update catalog 134 with metadata 210 about regions 122 at storage 120. After allocating one or more regions 122 or closing them, application 310 may attempt to update catalog 134 by first reviewing identifier 132 to determine whether it has changed. In an embodiment in which identifier 132 explicitly identifies node 140 (e.g., by specifying an IP address, node ID, etc.), application 310 may retrieve identifier 132 via an authorization identifier request 315 and confirm that the identifier 132 still indicates that its node is the active one. In an embodiment in which identifier 132 does not explicitly point to node 140 (e.g., it is a generic string of characters), the node, upon being the active node 140, requests and stores a local copy of identifier 132—shown as copy 320. When node 140 later attempts to update catalog 134, node 140 may compare its copy 320 with a copy of identifier 132 in metadata server 130 in order to confirm that identifier 132 has not been modified since it became the active node 140. If identifier 132 has not been modified, then active node 140 updates catalog 134; otherwise, node 140 does not update the catalog 134—and thus does not allocate any additional regions 122.

Figure 4:
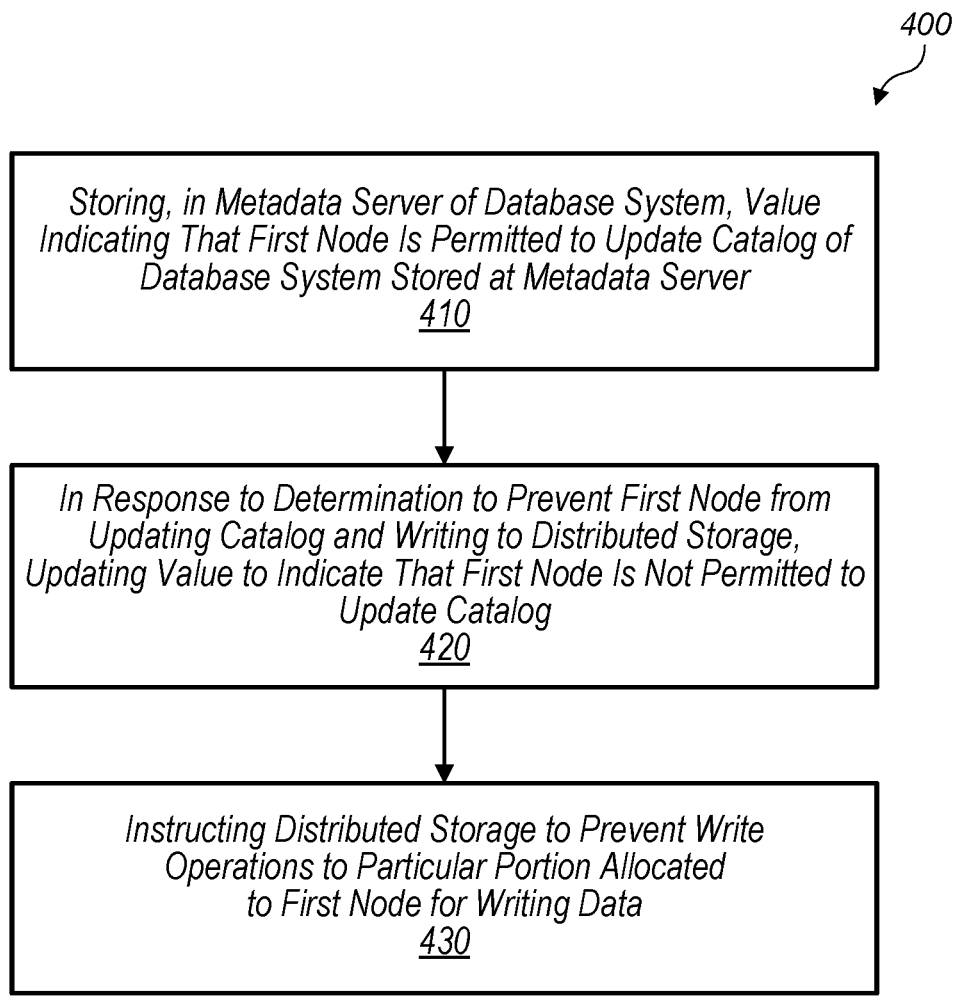
FIG. 4-6 are flow diagrams illustrating exemplary methods relating to fencing out a node, according to some embodiments.

Turning now to FIG. 4, a flow diagram of a method 400 is shown. Method 400 is one embodiment of a method performed by a computer system (e.g., database system 10) to fence-out a database node (e.g., node 140). In various embodiments, nodes (e.g., nodes 140 and 150) of the computer system execute a high availability (HA) application (e.g., HA cluster manager 110) that implements a HA database cluster and performs the steps of method 400. In some embodiments, method 400 includes additional steps such as reading from portions (e.g., regions 122) allocated at a distributed storage (e.g., storage 120).

Method 400 begins in step 410 with the computer system storing, in a metadata server (e.g., server 130), a value (e.g., identifier 132) indicating that a first node (e.g., node 140) is permitted to update a catalog (e.g., catalog 134) stored at the metadata server of the database system. The first node may examine the value prior to updating the catalog. As an example, in one embodiment, the first node allocates a set of portions at the distributed storage for writing data and in response to doing so, attempts to update the catalog with metadata about the allocated set of portions. The first node may do so by first examining the value stored in the metadata server to determine whether it has been updated. In various cases, the first node may determine that the value has not been updated and as a result, update the catalog to include indications of the allocated portions. In other embodiments, the first node determines that the value has been updated and ceases allocating portions at the distributed storage. In various embodiments, the value is stored at the distributed storage instead of the metadata server.

In response to a determination to prevent the first node from updating the catalog and writing to the distributed storage, in step 420, the computer system updates the value stored at the metadata server to indicate that the first node is not permitted to update the catalog. This determination may result from a request from a user or through an automation process. In various instances, the HA application may make this determination. In some embodiments, the HA application elects a second node (e.g., node 140) for writing data to the distributed storage and causes the elected node to update the value and store a copy of it (e.g., authorization identifier copy 320).

In step 430, the computer system instructs the distributed storage to prevent write operations to a particular portion allocated to the database node for writing data. In some embodiments, the distributed storage stores a write flag for each allocated portion and in response to being instructed, sets the write flag of the particular portion to indicate that nodes of the computer system cannot write data to the particular portion.

Figure 5:
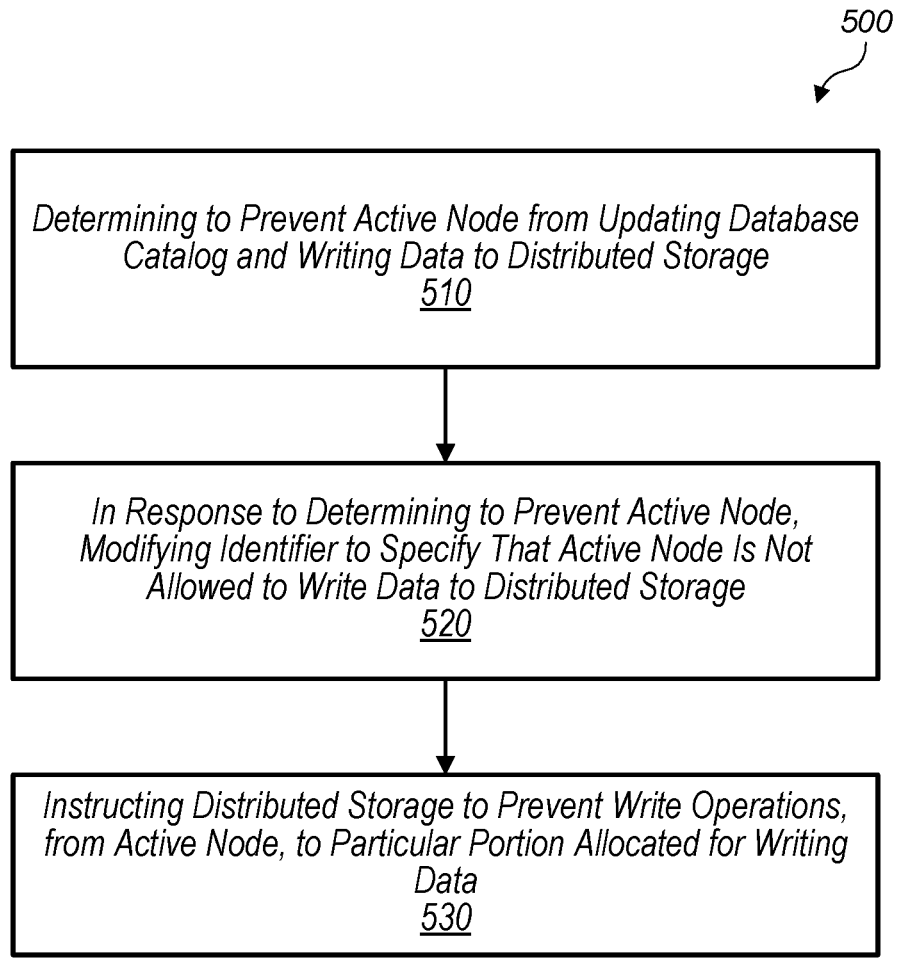

Turning now to FIG. 5, a flow diagram of a method 500 is shown. Method 500 is one embodiment of a method performed by a database system (e.g., system 10) to fence-out an active node (e.g., node 140). As with method 400, the steps of method 500 may be performed by an HA application (e.g., manager 110) distributed across the nodes (e.g., nodes 140 and 150) of the database system. In various embodiments, method 500 includes additional steps—e.g., a standby node (e.g., node 150) monitoring a catalog (e.g., catalog 134) to determine whether any new portions (e.g., regions 122) have been allocated by the active node.

Method 500 begins in step 510 with the database system determining to prevent an active node from updating the catalog and writing data to a distributed storage (e.g., storage 120). In response to determining to prevent the active node, in various embodiments, the database system elects a new active node for writing data to the distributed storage. The determination may be made in response to receiving a request from a client system.

In response to determining to prevent the active node from updating the catalog, in step 520, the database system modifies an identifier (e.g., 132) to indicate that the active node is not allowed to update the catalog. In various embodiments, a metadata server (e.g., server 130) maintains the identifier. The active node may store an instance of the identifier (e.g., copy 320) and use the instance to determine whether the identifier has been modified prior to updating the catalog. In various embodiments, the active node makes this determination by comparing the stored instance with the identifier maintained at the metadata server. In some embodiments, the active node discontinues updating the catalog to indicate portions allocated by the active node in response to determining that the stored instance does not match the identifier. In some embodiments, the database system causes the newly elected node to modify the identifier and to store an instance of the modified identifier to determine whether the modified identifier has been subsequently modified. In various embodiments, the identifier maintained by the metadata server is a numerical value.

In step 530, in response to determining to prevent the active node from writing data to the distributed storage, the database system instructs the distributed storage to prevent write operations, from the active node, to a particular portion allocated for writing data. In various embodiments, the distributed storage maintains write flags for portions allocated at the distributed storage. These flags may indicate whether a given portion may be written to by the active node. In response to being instructed to prevent writes by the database system, the distributed storage may set a flag that is associated with the particular portion to indicate that the particular portion cannot be written to by the active node.

Figure 6:
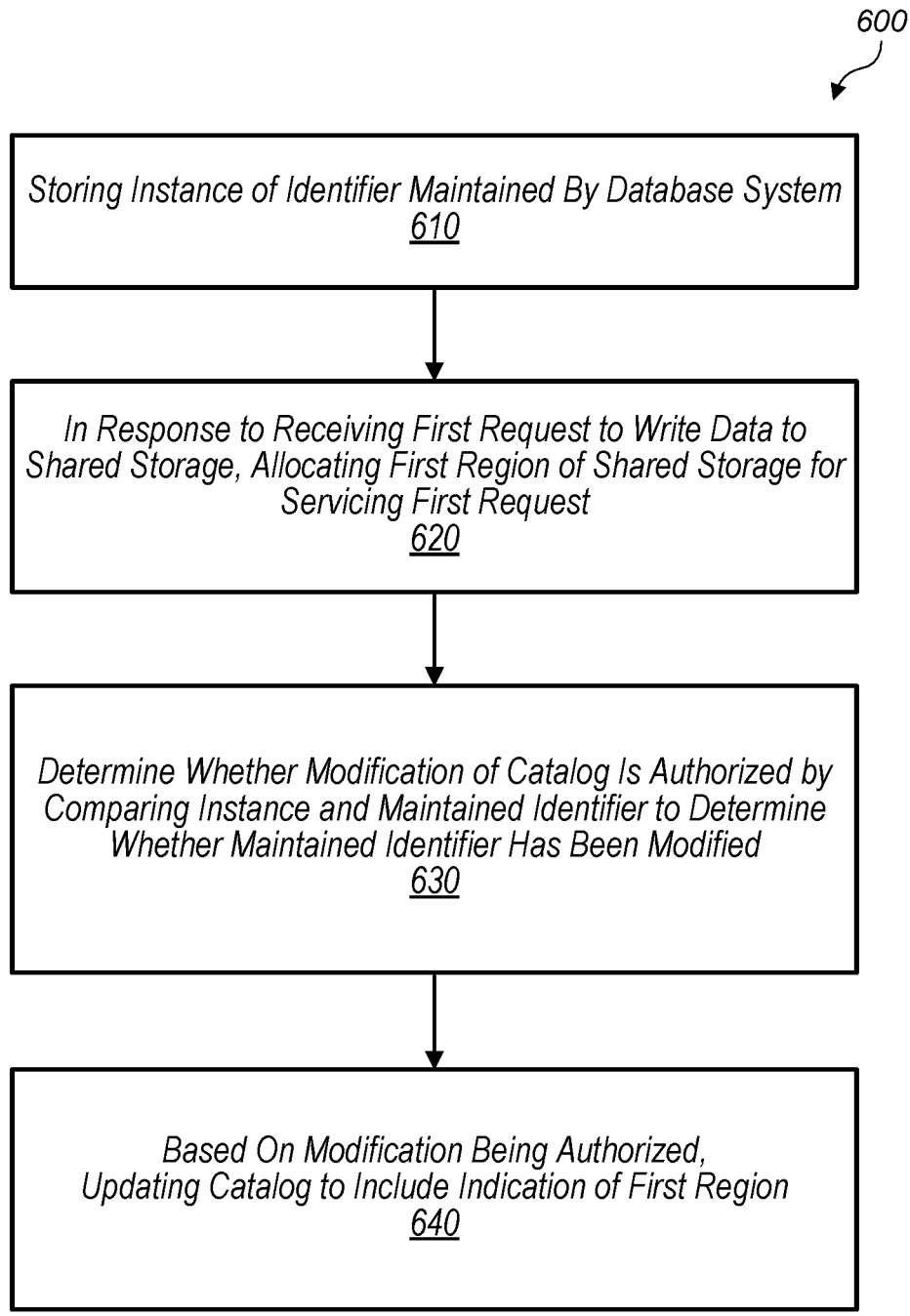

Turning now to FIG. 6, a flow diagram of a method 600 is shown. Method 600 is one embodiment of a method performed by a database node (e.g., node 140) to allocate a region (e.g., region 122) of a shared storage (e.g., storage 120) and update a catalog (e.g., catalog 134) to indicate the allocated region. The steps of method 600 may be performed in response to receiving a request to service a transaction request (e.g., request 146) for writing data to the shared storage. In various embodiments, method 600 includes additional steps—e.g., determining whether an allocated region has capacity for storing additional data, determining that an issue has occurred with a database node, etc.

Method 600 begins in step 610 with a database node storing an instance (e.g., copy 320) of an identifier (e.g., 132) maintained by the database system (e.g., system 10) of the database node. In various embodiments, the identifier is set to indicate that the database node is allowed to modify a catalog of the database system. Initially, the database system may select the database node from multiple database nodes for writing data to the shared storage. In response to being selected for writing data, the database node may modify the identifier to indicate that the newly elected database node is allowed to modify the catalog. Thereafter, in various embodiments, the database node performs step 610.

In response to receiving a request to write data to the shared storage, in step 620, the database node allocates a region of the shared storage for servicing the request. In some embodiments, the database node attempts to write data to the region and determines that the database system has prevented the database node from writing data to the region. In various embodiments, the shared storage maintains an indication of whether a particular region may be written to by a database node (e.g., node 140).

In step 630, the database node determines whether modification of the catalog is authorized by comparing the instance and the maintained identifier to determine whether the maintained identifier has been modified. The database node may execute a high availability (HA) application (e.g., manager 110) to implement an HA database cluster. In some embodiments, the HA application monitors a heartbeat of the database node to determine whether an issue has occurred at the database node. In response to determining that an issue has occurred at the database node, the HA application may modify the identifier to indicate that the database node is not allowed to modify the catalog and may instruct the shared storage to prevent write operations to the allocated region. In some embodiments, the HA application elects the other database node for writing data to the shared storage and the other node modifies the identifier and instructs the shared storage.

Based on the modification being authorized, in step 640, the database node updates the catalog to include an indication of the allocated region. In some embodiments, based on determining that the maintained identifier has been modified to indicate that the database node is not allowed to modify the catalog, the database node may cease updating the catalog to include the indication of the allocated region. In some cases, the catalog not including an indication of the allocated region causes other nodes (e.g., 150) to be unaware of the allocated region.

Exemplary Computer System

Figure 7:
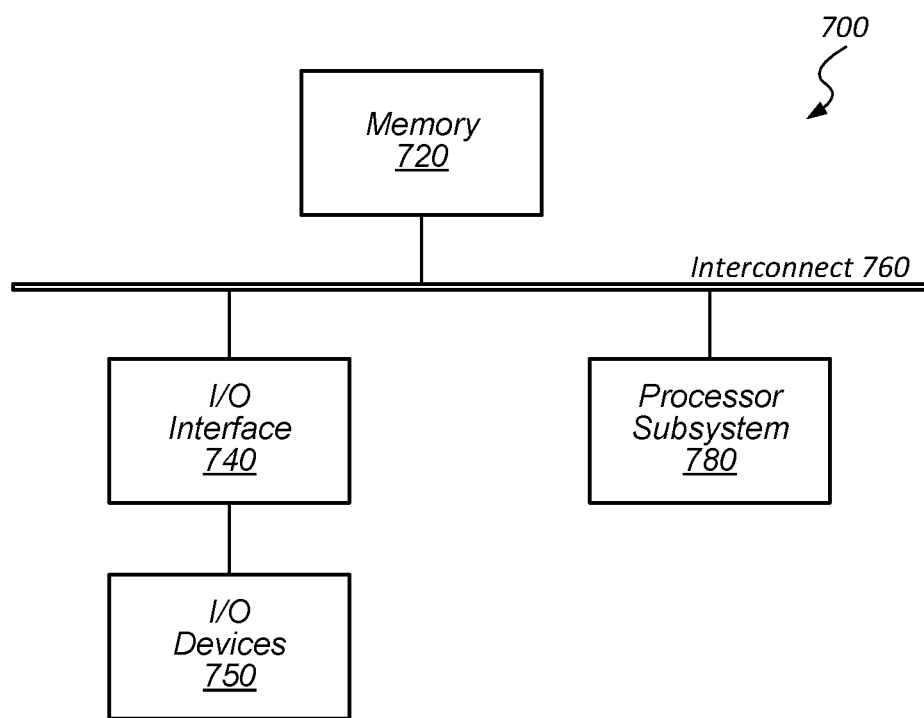
FIG. 7 is a block diagram illustrating an exemplary computer system, according to some embodiments.

Turning now to FIG. 7, a block diagram of an exemplary computer system 700, which may implement database system 10, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, manager 110 described above may include (or be included within) system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for a database system to fence out a first one of a plurality of database nodes in a database cluster operable to handle requests for data that is stored by a central storage shared among the plurality of database nodes, the method comprising:
   storing, at a metadata server of the database system, an authorization identifier that indicates that the first database node is permitted to update a catalog at the metadata server, wherein the catalog references portions allocated at the central storage for storing data and enables other ones of the plurality of database nodes to access the allocated portions, and wherein the first database node is operable to examine the authorization identifier prior to updating the catalog to reference additional portions;
   making a determination that the first database node is malfunctioning;
   in response to the determination, fencing out the first database node to prevent the first database node from writing data to the central storage on behalf of the database cluster, wherein fencing out the first database node includes:
      updating, at the metadata server, the authorization identifier to indicate that a second one of the plurality of database nodes and not the first database node is permitted to update the catalog to reference additional portions allocated at the central storage for storing data;
      instructing the central storage to prevent write operations to one or more portions already allocated at the central storage by the first database node; and
      causing the second database node to begin writing data to the central storage on behalf of the database cluster.

2. The method of claim 1, wherein the plurality of database nodes are configured to execute a high availability (HA) application to implement the database cluster, wherein the method is performed by the HA application.

3. The method of claim 2, further comprising:
   the HA application electing the second database node for writing data to the central storage; and
   in response to electing the second database node, the HA application causing the second database node to maintain a copy of the authorization identifier, wherein the second database node is configured to compare the copy of the authorization identifier with the authorization identifier stored at the metadata server prior to updating the catalog.

4. The method of claim 1, wherein the first database node is configured to:
   allocate a set of portions at the central storage for storing data;
   in response to allocating the set of portions, attempt to update the catalog of the database system, including examining the authorization identifier to determine whether the authorization identifier has been updated; and
   in response to determining that the authorization identifier has been updated, cease allocating portions at the central storage.

5. The method of claim 1, wherein the first database node is configured to:
   allocate a set of portions at the central storage for storing data;
   in response to allocating the set of portions, attempt to update the catalog of the database system, including examining the authorization identifier to determine whether the authorization identifier has been updated; and
   in response to determining that the authorization identifier has not been updated, update the catalog to include an indication of the set of allocated portions.

6. The method of claim 5, wherein a third one of the plurality of database nodes is configured to:
   monitor the catalog of the database system to determine portions that have been allocated by the first database node; and
   in response to the first database node updating the catalog, use the indication to read from the set of allocated portions for updating a cache maintained by the third database node.

7. A database system, comprising:
   a plurality of database nodes configured to implement a database cluster;
   a central storage to shared among the plurality of database nodes and configured to store data of the database system; and
   a metadata server configured to maintain an authorization identifier indicating that an active one of the plurality of database nodes is allowed to update a database catalog at the metadata server, wherein the database catalog references portions allocated at the central storage for storing data and enables other ones of the plurality of database nodes to access the allocated portions;
   wherein the database system is configured to:
      in response to determining that the active database node is malfunctioning, fence out the active database node to prevent the active database node from writing data to the central storage on behalf of the database cluster, wherein fencing out the active database node includes:

modifying, at the metadata server, the authorization identifier to indicate that a second one of the plurality of database nodes and not the active database node is allowed to update the database catalog to reference additional portions allocated at the central storage;

instructing the central storage to prevent write operations, from the active database node, to one or more portions already allocated at the central storage by the active database node; and causing the second database node to begin writing data to the central storage on behalf of the database cluster.

8. The database system of claim 7, wherein the active database node is configured to:
store an instance of the authorization identifier maintained by the metadata server; and
determine whether the authorization identifier has been modified by comparing the stored instance of the authorization identifier and the authorization identifier maintained by the metadata server.

9. The database system of claim 8, wherein the active database node is configured to:
in response to determining that the stored instance does not match the authorization identifier, discontinue updating the database catalog to indicate portions allocated by the active database node.

10. The database system of claim 7, wherein the central storage is configured to:
maintain a plurality of flags for portions allocated at the central storage, wherein ones of the plurality of flags indicates whether a given portion can be written to by the active database node; and
in response to being instructed to prevent write operations from the active database node, set ones of the plurality of flags that are associated with the one or more portions already allocated to indicate that the one or more portions already allocated cannot be written to.

11. The database system of claim 7, wherein the active database node is configured to:
for servicing a request from a client device, allocate a set of one or more portions at the central storage for writing data; and
in response to determining that the authorization identifier has not been modified, update data of the database catalog to provide one or more indications of the set of one or more portions.

12. The database system of claim 7, wherein the database system is configured to:
in response to determining to prevent the active database node:
select the second database node to be a second active database node for writing data to the central storage; and
cause the second active database node to store an instance of the modified authorization identifier, wherein the instance is usable to determine whether the modified authorization identifier has been subsequently modified.

13. The database system of claim 12, wherein the database system is configured to:
prior to causing the second active database node to store the instance, modify the authorization identifier by causing the second active database node to modify the authorization identifier, wherein the authorization identifier is a numerical value.

14. A non-transitory, computer-readable medium having program instructions stored thereon that are capable of causing a first database node in a database cluster of a database system to perform operations comprising:
storing an instance of an authorization identifier that is maintained at a metadata server of the database system, wherein the authorization identifier is set to indicate that the first database node is allowed to modify a catalog at the metadata server, wherein the catalog references regions allocated at a central storage shared among database nodes of the database cluster, and wherein the catalog enables a set of other database nodes to access the allocated regions;
in response to receiving a first request to write data to the central storage:
allocating a first region at the central storage for servicing the first request;
determining whether modification of the catalog is authorized by comparing the instance of the authorization identifier at the first database node with the authorization identifier maintained at the metadata server to determine whether the maintained authorization identifier has been modified; and
based on the modification being authorized, updating the catalog to include an indication of the first region, wherein the indication enables the set of other database nodes to access the first region.

15. The non-transitory, computer-readable medium of claim 14, wherein the operations further comprise:
in response to receiving a second request to write data to the central storage:
allocating a second region at the central storage;
comparing the instance of the authorization identifier at the first database node with the authorization identifier maintained at the metadata server to determine whether the maintained authorization identifier has been modified; and
in response to determining that the maintained authorization identifier has been modified, determining to not update the catalog to include an indication of the second region.

16. The non-transitory, computer-readable medium of claim 14, wherein the operations further comprise:
for servicing a second request, attempting to write data to the first region; and
in response to the attempting, determining that the database system has prevented the first database node from writing data to the first region, wherein the central storage is configured to maintain an indication of whether a particular region is writable to by a database node of the database system.

17. The non-transitory, computer-readable medium of claim 14, wherein the database system is configured to select one of the set of other database nodes of the database system for writing data to the central storage, and wherein the operations further comprise:
in response to the database system selecting the other database node for writing data to the central storage:
modifying the authorization identifier to indicate that the other database node is allowed to modify the catalog of the database system; and
performing the storing of the instance of the authorization identifier maintained by the database system.

18. The non-transitory, computer-readable medium of claim 14, wherein the operations further comprise:

executing a high availability (HA) application to implement the database cluster, wherein the HA application is operable to:
  monitor a heartbeat of the first database node to determine whether an issue has occurred at the first database node; and
  in response to determining that an issue has occurred at the first database node, modify the authorization identifier to indicate that the first database node is not allowed to modify the catalog and instruct the central storage to prevent write operations to the first region.

\* \* \* \* \*